R. B. CUMMINS.
WHEELBARROW.
APPLICATION FILED JUNE 24, 1918.
1,325,557.
Patented Dec. 23, 1919.
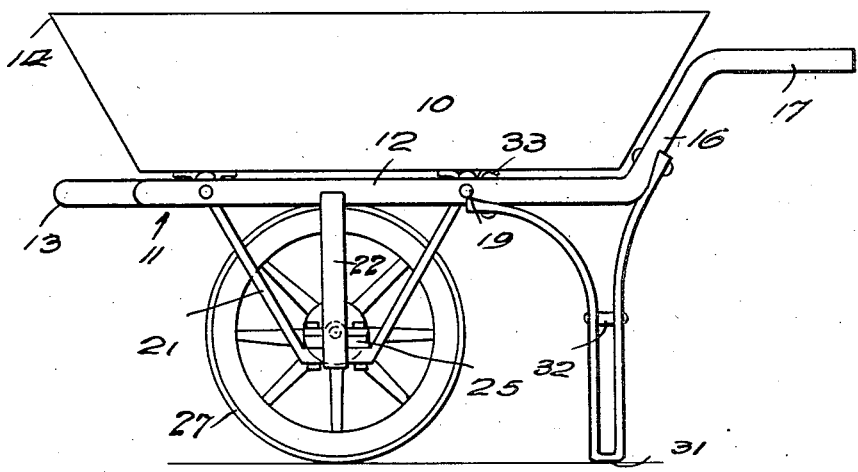
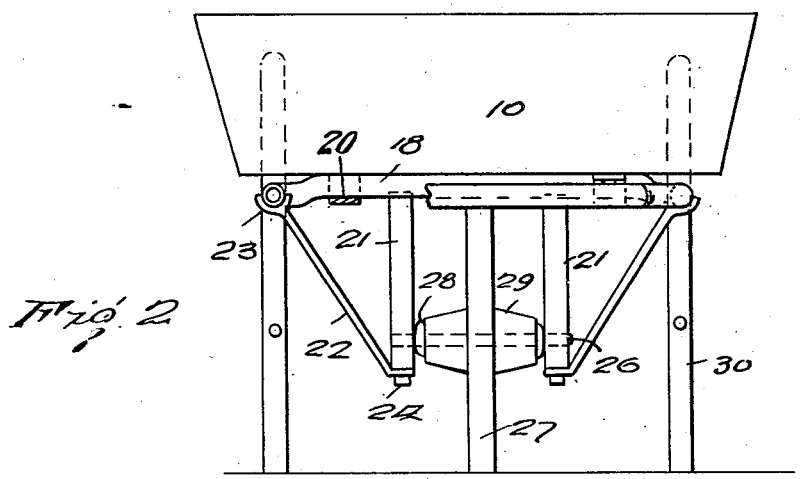
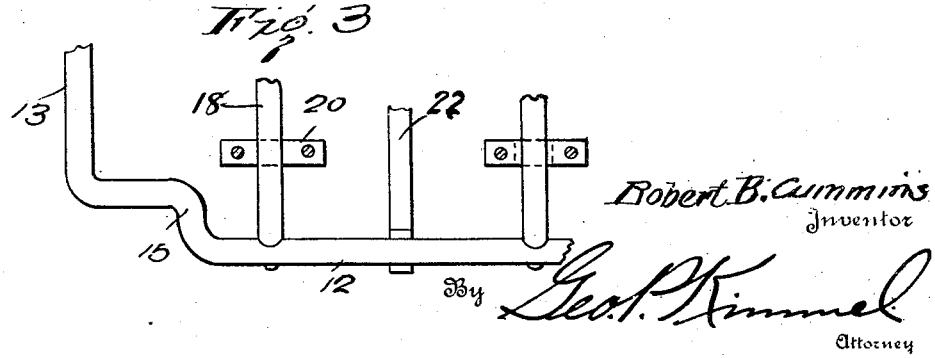
Robert B. Cummins
Inventor
By Geo. P. Kimmel
Attorney

UNITED STATES PATENT OFFICE.

ROBERT B. CUMMINS, OF KOKOMO, INDIANA.

WHEELBARROW.

1,325,557.　　　　　Specification of Letters Patent.　　Patented Dec. 23, 1919.

Application filed June 24, 1918. Serial No. 241,555.

*To all whom it may concern:*

Be it known that I, ROBERT B. CUMMINS, a citizen of the United States, residing at Kokomo, in the county of Howard and State of Indiana, have invented certain new and useful Improvements in Wheelbarrows, of which the following is a specification.

This invention relates to improvements in wheel barrows and the object thereof is to so position the supporting or transporting wheel that the same will be slightly off-center so that the load will balance, and thereby relieve the operator or workman from bearing the burden of or carrying the load, as is necessary where the wheel is set forwardly of the bed of the wheel barrow, as wheel barrows are now commonly constructed, it therefore being necessary only to push the load while being relieved of its weight.

A further object of the invention is to provide a wheel barrow which will facilitate the dumping of the load, the wheel barrow being adapted to be stood on end in dumping position.

With the above and other objects in view, as will appear as the description proceeds, the invention comprises the various novel features of construction and arrangement of parts which will be more fully described hereinafter and set forth with particularity in the claim appended hereto.

Reference is had to the accompanying drawings, forming a part of this specification, in which like reference characters indicate corresponding parts throughout the several views, and wherein, Figure 1 is a side elevation of my improved wheel barrow, Fig. 2 is a front elevation thereof partly broken and in section, and Fig. 3 is a fragmentary detail of the frame of the wheel barrow at one side.

Referring to the drawings in detail, my improved wheel barrow is shown as comprising a bed portion 10 which may be of the usual or any preferred construction but which is preferably made of sheet metal and of hopper like formation. This bed is supported upon the frame 11 comprising side portions 12, the frame being formed in a substantially U-shaped member of tubing having its connecting or bight portion 13 projected forwardly of the bottom portion of the bed and in substantial vertical alinement with the extreme forward edge of the bed indicated at 14.

The side portions 12 are bent inwardly at 15 so that the connecting or bight portion 13 is reduced in width with respect to the frame width between the side portions proper. The rear ends of the side portions 12 are projected upwardly at 16 and rearwardly and horizontally at 17 to produce handles by which the barrow may be wheeled.

The bed is supported upon a wheeled frame which further comprises longitudinally spaced transverse frame members 18, also of tubular formation and connected to the sides of the frame as shown at 19.

Suitable fastening means or straps 20 are provided for connecting the transverse frame members 18 to the bed 10, and the bed and frame rest upon hangers 21 of substantially V-shaped formation and having their upper ends secured to the transverse frame members 18. Braces 22 are provided for the hangers 21 and these braces have arcuate upper ends 23 brazed to the side portions 12 of the frame, the lower ends of the diagonal braces 22 having connection with the horizontal bottom portions of the hangers 21 as shown at 24. These horizontal portions serve to carry bearings 25 which receive the spindle 26 for the transporting wheel 27, the spindle having fixed collars 28 thereon positioned between the ends of the hub 29 and the bearings 25 carried by the hangers 21, so as to avoid end thrust.

Legs or standards 30 are provided at the rear of the bed or container 10 at the rearmost portions of the horizontal side portions 12 of the frame and in rear of the hangers 21, said standards preferably consisting of sections of metal rebent intermediately of their ends as shown at 31, said connecting or bight portions 31 serving to engage the ground and support the wheel barrow with the bed in a horizontal position. The opposed side portions of the standards are connected as shown at 32 and the free ends thereof are bent at divergent relation for connection to the frame as shown at 33, adjacent to the rear portions of the hangers 21 and the upwardly bent angular portions 16, thereby providing a very firm frame and supporting structure.

As the wheel is set slightly forwardly or off-center, the load will be balanced and the operator or workman will not need to bear the weight of the load but simply to push the wheel barrow. Also, the wheel barrow may be easily tilted forwardly for dumping and when so tilted, it will stand in a vertical position upon the edge portion 14 of the bed and the forwardly projecting or bight portion 13 of the frame, although for ordinary purposes, tilting of the wheel barrow and bed at an angle so that it will rest upon the frame portion 13, will be sufficient without causing it to rest upon the edge 14. By resting it upon the edge 14, however, the packing of the wheel barrow is facilitated as for storage and the like.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new and desire to secure by Letters Patent of the United States, is:

A wheel barrow including a frame having side members, transverse connecting members attached to the side members of the frame, a body mounted upon the transverse members, substantially V-shaped parallel bearing hangers depending from the transverse members and arranged inwardly of the side members, a supporting wheel mounted in the bearing hangers and opposed diagonal braces connected at their lower terminals with the hangers and extending upwardly and outwardly and connected at their upper terminals with the side members of the frame to reinforce the bearing hangers and prevent lateral movement thereof.

In testimony whereof, I affix my signature hereto.

ROBERT B. CUMMINS.